Oct. 4, 1955 A. LEVITT 2,719,306

FOLDING BATHTUB FOR INFANTS

Filed Oct. 25, 1952 5 Sheets-Sheet 1

INVENTOR.
Arnold Levitt
BY Louis C. Smith
Attorney.

Oct. 4, 1955 A. LEVITT 2,719,306

FOLDING BATHTUB FOR INFANTS

Filed Oct. 25, 1952 5 Sheets-Sheet 2

INVENTOR.
Arnold Levitt
BY
Louis C. Smith
Attorney.

Oct. 4, 1955 A. LEVITT 2,719,306

FOLDING BATHTUB FOR INFANTS

Filed Oct. 25, 1952 5 Sheets-Sheet 3

INVENTOR.
Arnold Levitt
BY Louis C. Smith
Attorney.

Oct. 4, 1955 A. LEVITT 2,719,306

FOLDING BATHTUB FOR INFANTS

Filed Oct. 25, 1952 5 Sheets-Sheet 4

INVENTOR.
Arnold Levitt
BY Louis C. Smith
Attorney

Oct. 4, 1955 A. LEVITT 2,719,306

FOLDING BATHTUB FOR INFANTS

Filed Oct. 25, 1952 5 Sheets-Sheet 5

INVENTOR.
Arnold Levitt
BY Louis C. Smith
Attorney.

United States Patent Office 2,719,306

Patented Oct. 4, 1955

2,719,306

FOLDING BATHTUB FOR INFANTS

Arnold Levitt, Brighton, Mass.

Application October 25, 1952, Serial No. 316,853

4 Claims. (Cl. 4—177)

This invention relates to a folding bathtub for infants, and particularly to a folding bathtub of the type adapted to be mounted on the top edge of a standard bathtub.

The device of the present application is in the nature of an improvement on that shown in my co-pending application, Serial Number 308,574 filed September 9, 1952, now Patent Number 2,698,948 issued January 11, 1955.

An object of the present invention is to provide an improved folding bathtub which has increased rigidity when it is extended for use.

Another object is to provide an improved folding bathtub which will be supported at a higher elevation when it is folded than when it is extended for use, an advantage of this being that the folded tub is more completely out of the way for persons using the standard tub.

Still another object of the present improvement is to provide a folding bathtub in which the flexible folding tub portion is readily removable from and replaceable on the supporting frame.

Further objects of the invention are to improve folding bathtubs of this type in the particulars hereinafter set forth.

Figure 1:
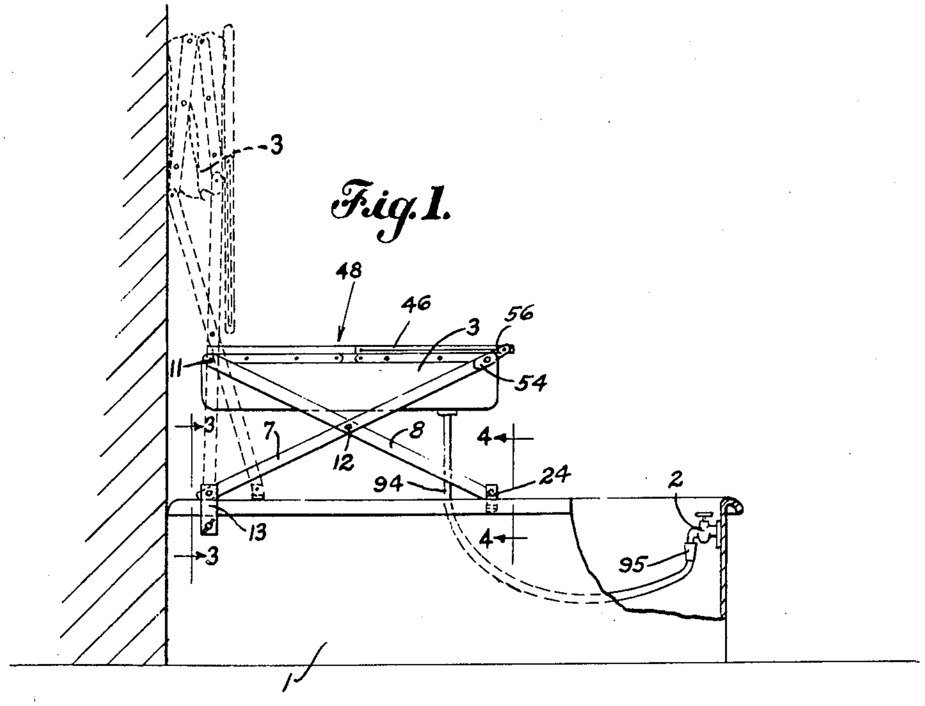
Fig. 1 is a side view of a bathtub embodying my invention mounted on a standard bathtub.

In the drawings, 1 indicates the standard bathtub such as is usually employed in bathrooms, and 2 is the faucet from which the bathtub is filled.

Figure 6:
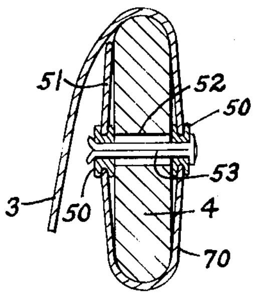
Fig. 6 is an enlarged section on the line 6—6, Fig. 2.
Figure 9:
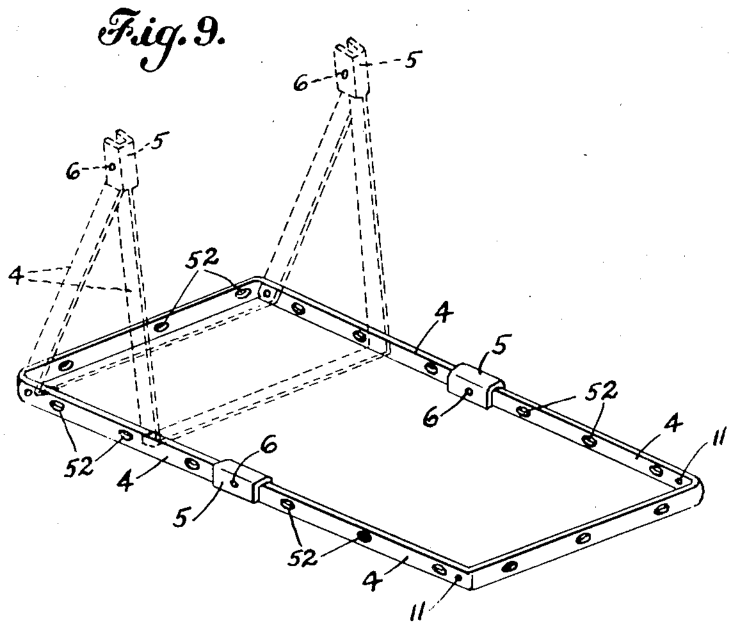
Fig. 9 is a perspective view of the folding frame supporting the folding bathtub.

The folding bathtub embodying my invention is indicated at 3 and it is made from any suitable flexible water resistant material such as a suitable plastic material or rubberized fabric. The folding tub 3 is mounted on a folding frame shown in Fig. 9 and which comprises two U-shaped frame members 4 that are pivotally connected at 6 to form a rectangular frame which, however, can be folded, as shown in dotted lines Fig. 9. The folding tub 3 is detachably secured to the folding frame so that it can be readily removed therefrom or replaced thereon. For this purpose the folding tub 3 is formed at each end with an attaching flap 70 and at each side with an attaching flap 71. Each of these flaps is provided with a plurality of pairs of grommets 50, and the folding frame is provided with a plurality of openings 52. In attaching the tub 3 to the frame, the flaps 70, 71 are passed over and around the sides of the frame, as shown in Fig. 6, so as to bring the outside grommet of each pair of grommets on the inside of the frame and in alinement with one of the openings 52 of the frame. The grommets of each pair are so spaced that when the outside grommet is lined up with the opening 52 on the inside of the frame member, the other grommet 50 will be in line with said opening 52 on the outside of the frame member, as clearly seen in Fig. 6. A split or expansion pin 53 is then inserted through the alined grommets and the corresponding hole 52, as shown in Fig. 6, thereby firmly securing the flap of the tub 3 to the frame. The tub can be readily removed from the frame by merely withdrawing the pins 53, and if, therefore, a tub becomes damaged and requires replacement, the matter of detaching the damaged tub from the frame and installing a new tub is a simple one.

Figure 10:
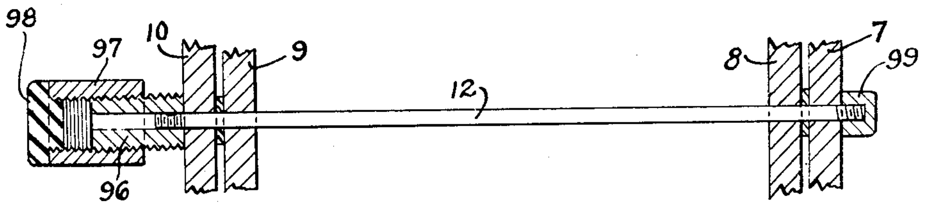
Fig. 10 is a section on the line 10—10, Fig. 5.

The folding tub is mounted on a supporting frame which comprises two pairs of crossed legs, 7, 8 and 9, 10. Each pair of legs is pivotally mounted on a rod 12 which extends from one side to the other of the supporting frame, as indicated in Fig. 10.

The upper ends of the legs 8 and 10 are pivotally connected to one end of the folding frame as indicated at 11, and the upper ends of the other legs 7 and 9 are similarly pivoted to the opposite end of the folding frame.

Figure 2:
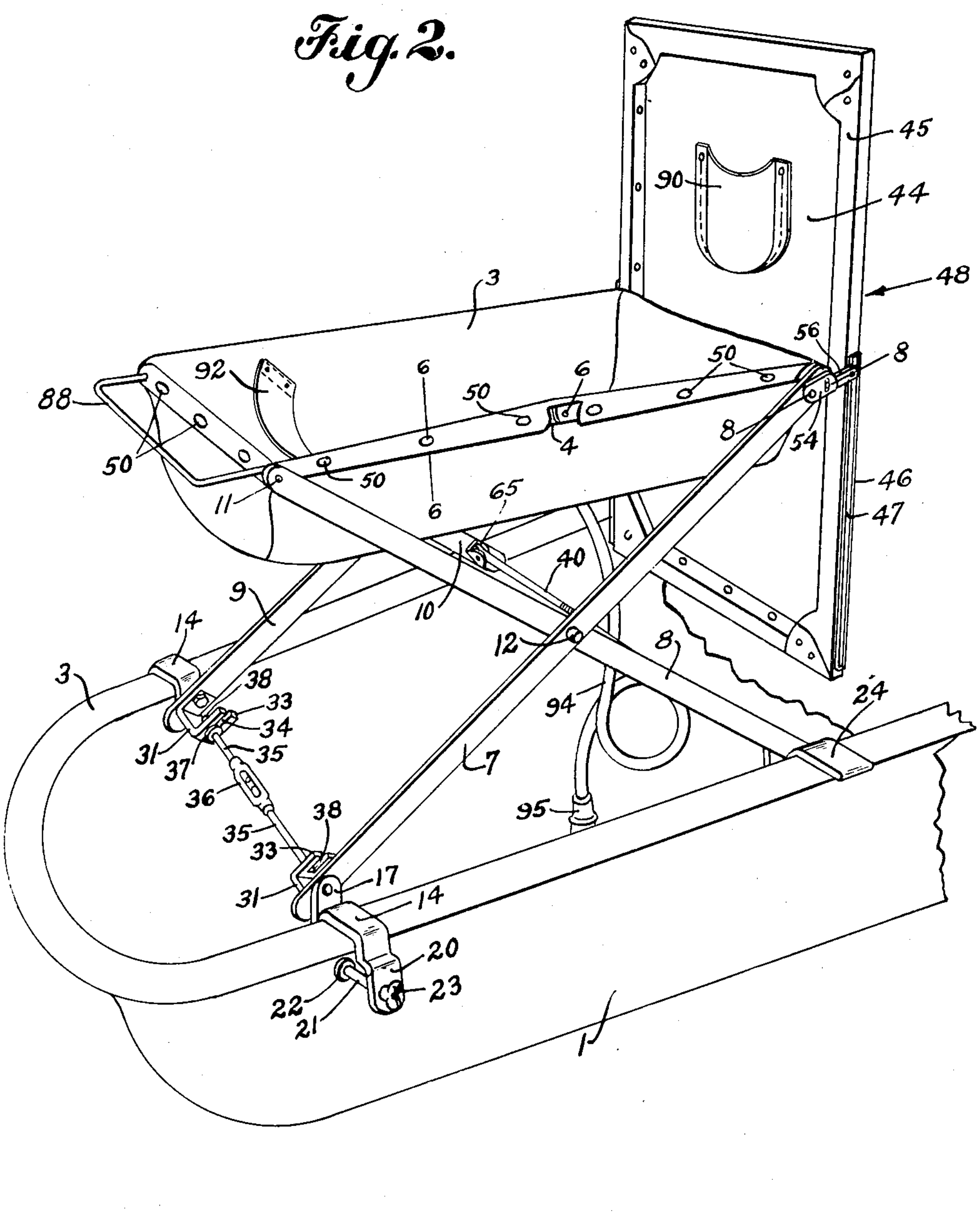
Fig. 2 is an enlarged perspective view showing the folding bathtub in its open condition and supported on the standard bathtub.

Secured to the lower end of each of the legs 7 and 9 is a shoe or foot member 13 adapted to rest on the top edge of the tub 1, and secured to the lower end of each of the other legs 8 and 10 is a shoe 24, also adapted to rest on the top of the tub 1, as indicated in Figs. 1 and 2. The feet 13 and also the feet 24 are pivotally secured to the lower end of the legs so that said feet will have a flat, firm bearing on the top of the standard tub 1 both when the tub is in its extended position shown in Fig. 2 or in the folded position shown in Fig. 5.

Figure 3:
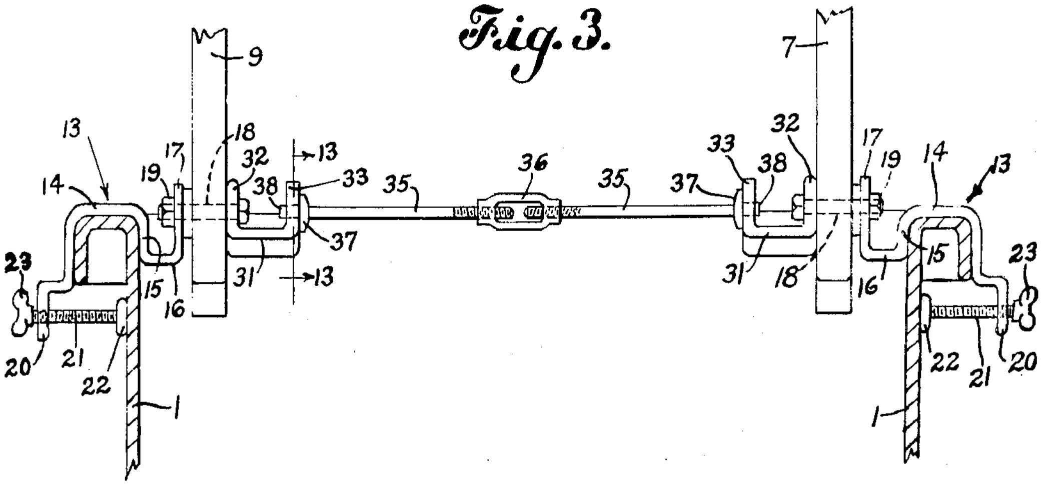
Fig. 3 is a section on the line 3—3, Fig. 1.

As illustrated in Fig. 3, each foot 13 has a portion 14 embracing the top edge of the tub 1, a downwardly extending portion 15 engaging the inside face of said tub 1, a laterally extending portion 16 and an upstanding portion 17, the latter being pivotally mounted on a bolt 18 carried by the lower end of the leg 9 or 7, said bolt being secured in position by the nut 19.

Each foot 13 also has a depending portion 20 which carries a clamping screw 21 having a pad 22 adapted to engage the outside of the tub 1. By manipulating the screw 21, the pad 22 may be firmly clamped against the outside of the tub.

A somewhat similar construction is employed for pivotally connecting the feet 24 to the legs 8 and 10. Each foot 24 has a flat portion 25 resting on the top of the tub 1, a downwardly extending clamping portion 26 engaging the inside of the tub, a laterally extending portion 27 and an upstanding portion 28 which is pivotally mounted on a bolt 60 mounted in the leg 8 or 10 near its lower end.

The nut 30 retains the foot member 24 on the bolt.

When the tub 3 is opened for use, as shown in Fig. 2, the legs of each pair have inclined positions, and said legs are held in their such inclined positions by the folding frame 4.

Figure 5:
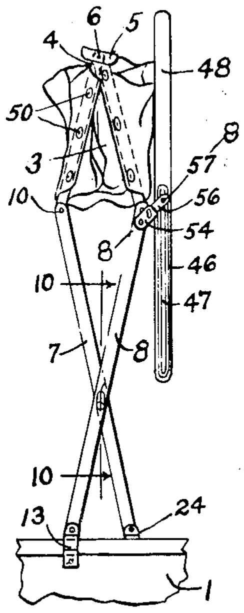
Fig. 5 is an enlarged view showing the bathtub in its folded condition.

When the folding tub 3 is folded, the legs of each pair will swing into nearly vertical positions, as shown in Fig. 5, but because of the pivotal connection between the feet 13 and 24 and said legs, said feet will retain their flat, firm bearing on the top of the tub 1 during the folding or extending movement of the bathtub.

There is also provided means connecting the lower end of the legs 7 and 9 by which the clamping portions 15 of the feet may be clamped against the inside of the tub. There is also provided means connecting the lower ends of the legs 8 and 10 by which the clamping portions 26 of the feet 24 may be clamped against the inside of the tub, thereby firmly holding the tub in its extended operative position.

Figures 11, 13:
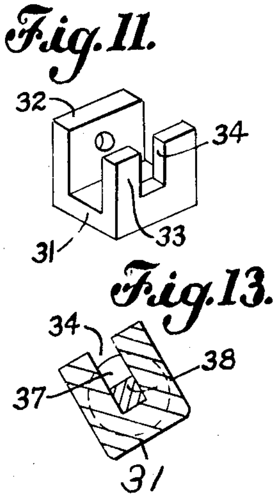
Fig. 11 is a perspective view showing the connecting member for connecting the extensible brace to the legs of the supporting frame.
Fig. 13 is a section on the line 13—13, Fig. 3.
Figure 12:
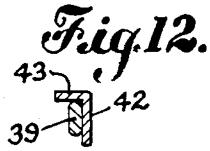
Fig. 12 is a section on the line 12—12, Fig. 4.

The means connecting the lower end of the legs 7 and 9 includes an extensible clamping member comprising the two sections 35 which are connected by the turnbuckle 36 by which the over-all length of the connecting member may be extended or contracted. Secured to the inner side of each of the legs 7 and 9 is a U-shaped connecting member 31, one arm 32 of which is clamped to the leg by the bolt 18. The other arm 33 of each connecting member is provided with a slot 34, as shown in Fig. 11, and each section 35 of the extensible member has a square end 38 which is received in the slot 34 and also has a collar 37 engaging the inside of the arm 33.

The turning of the turnbuckle 36 in one direction will move the sections 35 away from each other, thereby clamping the collars 37 against the arms 33 with the result that the lower ends of the legs 7, 9 will be forced apart and the clamping sections 15 of the feet 13 will be clamped firmly against the side of the tub.

The turning of the turnbuckle 36 in the opposite direction will release the clamping pressure so as to permit the feet 13 to be moved on the tub 1 as desired. The use of the open slots 34 provides for removing the extensible member 35, if it is desired to do so.

Figure 4:
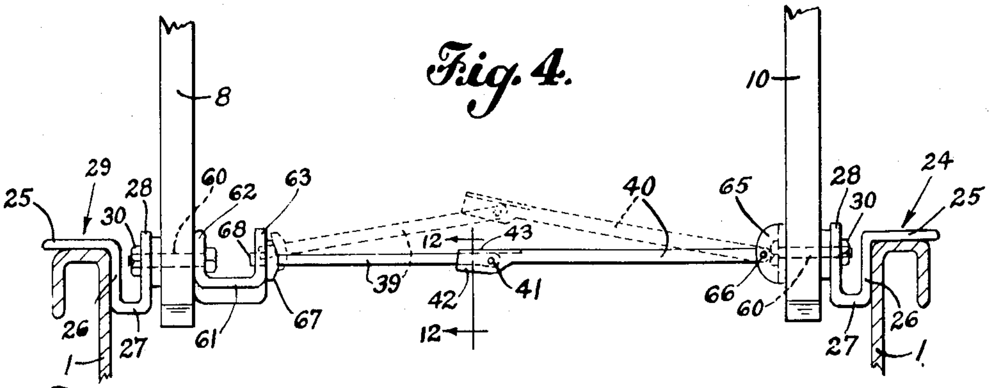
Fig. 4 is a section on the line 4—4, Fig. 1.

There is shown in Fig. 4 another form of extensible clamping member which is illustrated as connecting the lower ends of the legs 8 and 10. In this construction, the extensible member comprises two sections 39 and 40 pivotally connected at 41. The section 40 is pivoted at 66 to the cheek pieces 65 of a bracket member 64 that is secured to the lower end of the leg 10 by means of the bolt 60. The outer end 68 of the member 39 is square and is adapted to be received in an open ended slot formed in the arm 63 of a U-shaped member 61 which is secured to the lower end of the leg 8 by the bolt 60. The member 39 has the collar 67 which engages the inner face of the arm 63.

The members 39 and 40 constitute a toggle device which when straightened, as shown in full lines Fig. 4, applies an outward pressure to the lower ends of the legs 8 and 10 and thus firmly clamps the clamping portions 26 of the feet 24 against the inside of the tub 1. The member 40 is provided with a flat portion 42 carrying at its upper end a lip 43 which limits the downward swinging movement of the members 39, 40.

With this construction the unclamping of the legs 8 and 10 from the sides of the tub can be accomplished by breaking the toggle joint, as shown in dotted lines, Fig. 4, and the clamping of the feet in position is accomplished by straightening the toggle joint.

Figure 14:
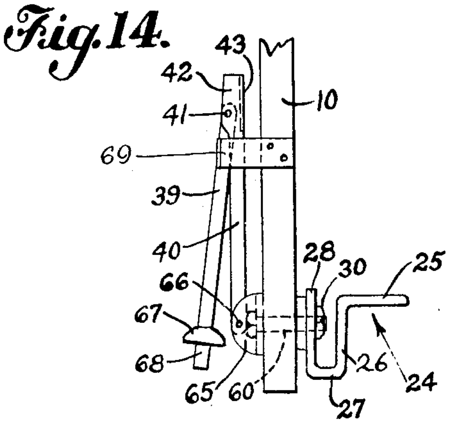
Fig. 14 is a fragmentary view showing one of the extensible clamping members in folded condition.
Figure 15:
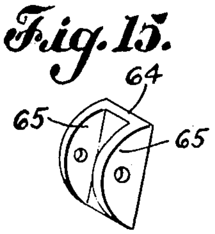
Fig. 15 is a detail showing the means for pivotally connecting the folding clamping member to a leg of the supporting frame.

The end of the member 39 is separable from the arm 63, thus permitting the toggle member to be folded up against the inside of the leg 10, as shown in Fig. 14. Said leg 10 is provided with a spring clip 69 by which the folded toggle joint device is retained in its folded position.

The device of this application is provided with a dressing table for the infant similar to that shown in my copending application Serial No. 308,574. Such dressing table is indicated at 48, and it comprises a skeleton frame 45 to which the canvas member 44 is secured. The dressing table 48 is of a length equal to the extended length of the folding tub 3, and it is connected to the upper ends of the legs 7 and 9 by means of a sliding pivotal connection, so that said dressing table may be placed in its upright inoperative position at the end of the extended bathtub 3, as shown in Fig. 2, or may be swung into its operative position overlying the extended tub as shown in Fig. 17.

For this purpose the dressing table has attached to each edge at one end a member 46 having a slot 47 which receives a pivotal pin 57 carried by an arm 56 which is secured to the upper end of each of the legs 7 and 9. The pivotal pin 57 is provided with a head 58 by which it is retained in the slot 47. Each arm 56 is pivoted at its lower end to a bracket 54, as shown at 55, that is secured to the upper end of the leg 7 or 9 and each arm 56 has a pin 59 which extends through and operates in a slot 73 formed in the bracket 54.

Figure 7:
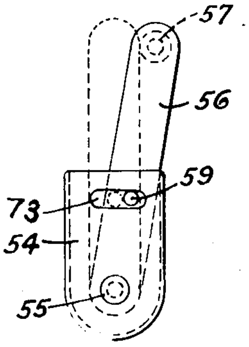
Fig. 7 is a detail showing the pivotal connection between the supporting frame and the dressing table.
Figure 8:
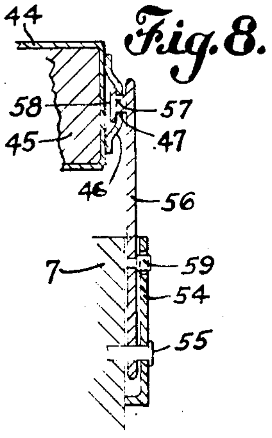
Fig. 8 is an enlarged section on the line 8—8, Fig. 5.
Figures 16, 17:
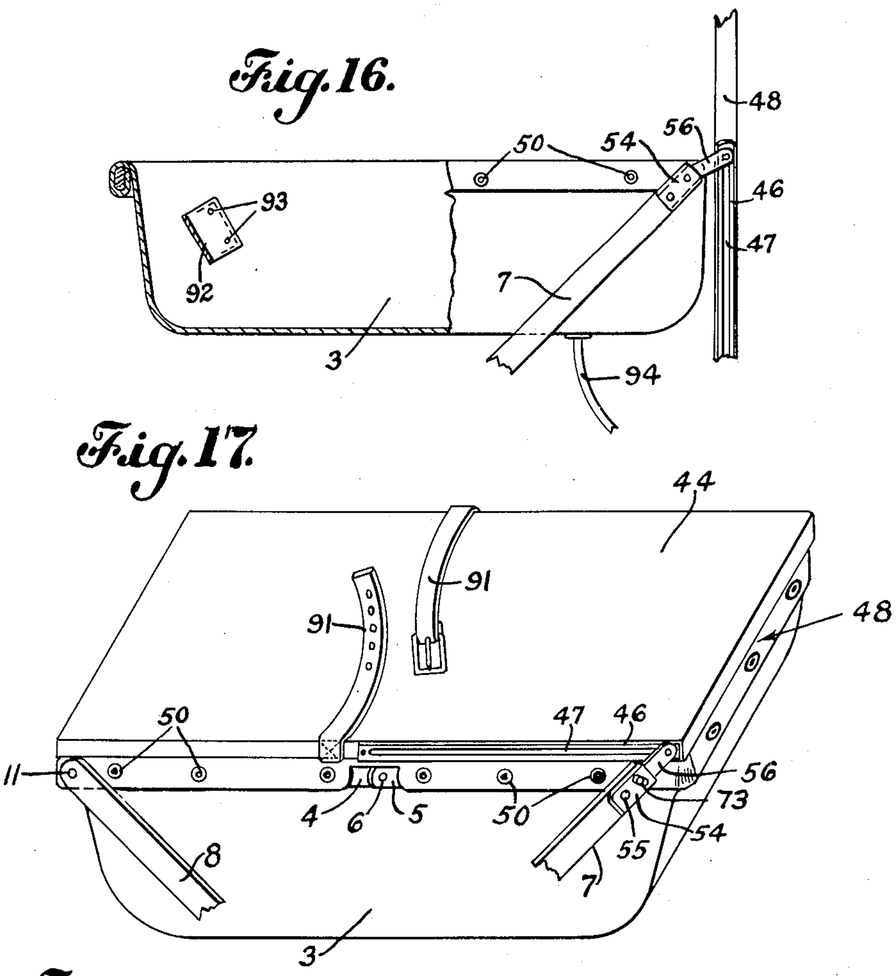
Fig. 16 is a side view of the folding bathtub with part broken out and showing the head rest for the infant.
Fig. 17 is a fragmentary view illustrating the dressing table in its operative position.
Figure 18:
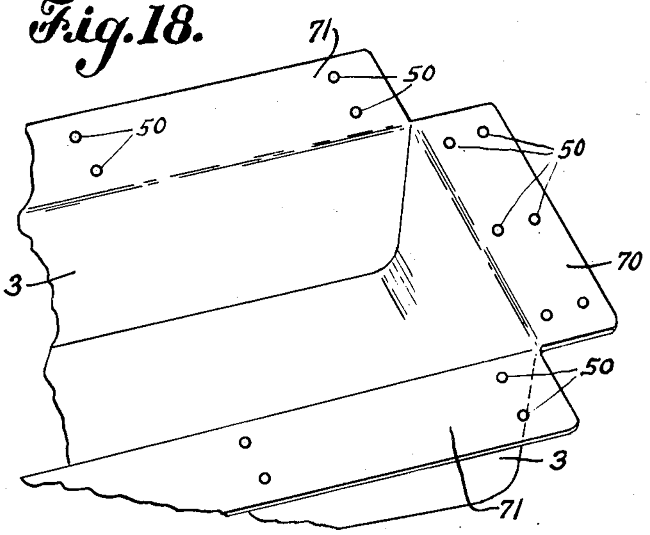
Fig. 18 is a fragmentary view of the folding tub showing the flaps by which it is secured to the folding frame.

When the dressing table 48 is in its vertical inoperative position, as shown in Figs. 2 and 16, the pivotal pin 57 is at the upper end of the slot 47 and the arm 56 is in the inclined position shown in Fig. 16 with the pin 59 at the lower end of the slot 73. When the dressing table 48 is swung into its operative position superposed on the bathtub 3 as shown in Figs. 1 and 17, the pivotal pin 57 is at the outer end of the slot 47 and the arm 56 is in its raised position shown in Fig. 17 and in dotted lines Fig. 7.

The dressing table 48 is provided at its under side with a pocket 90 to receive any desired toilet articles which may be used during the bathing of the infant. This pocket 90 is located above the bathtub 3 and within convenient reach of the person bathing the infant.

The dressing table 48 is also preferably provided with a safety belt 91 which can be used for securing the infant to the top of the table.

The folding tub 3 is shown as provided with a head rest 92 for the infant. This head rest is in the form of a wide band extending from one side to the other of the tub 3, and having its ends fastened to the sides of the tub by any suitable fastening means 93. This head rest serves to hold the infant's head above the water during the bathing operation.

The tub is provided with a combined filling and draining tube 94 which has at its free end a hood 95 adapted to be fitted over the faucet 2. To fill the tub 3 the tube 94 is attached to the faucet 2 and the latter is opened. When the tub is properly filled the faucet 2 may be closed and the connection between the tube 94 and the faucet will retain the water in the tub 3. When the tub 3 is to be emptied all that is necessary is to pull the hood 95 from the faucet 2, thus letting the water in the tub 3 to drain into the standard tub 1.

The crossed leg feature of the supporting frame increases the stability of the frame for the weight in or on the tub 3 holds the legs firmly in their crossed relation and prevents any movement of the lower ends of the legs toward each other, even if the said lower ends are not firmly clamped to the tub.

Moreover, when the tub is folded and the crossing legs are moved into their nearly upright position shown in dotted lines, Fig. 1 and in Fig. 5, the folded tub 3 is moved to a much higher elevation than when in its extended position as clearly shown in Fig. 1. Thus the folded tub will be entirely out of the way of any person using the standard tub 1.

When in the folded condition the dressing table 48 serves as a screen to hide the folded tub 3.

If the tub 1 is situated so that there is a wall along the back side of said tub, I propose to provide the pivotal rod 12 with an adjustable bumper to engage said wall and thus add stability to the tub when it is extended for use.

As shown in Fig. 10, the pivotal rod 12 is exteriorly screw threaded at each end, and on the end thereof toward the wall, if there is a wall along the back side of the tub 1, is mounted an extensible bumper which, as shown in Fig. 10, comprises an exteriorly screw threaded member 96 which is screw threaded to the end of the rod 12, and an extension member 97 which is screw threaded onto the member 96, the member 97 carrying at its outer end a rubber bumper 98. This bumper can be extended by turning the member 97 on the member 96, and after the folding tub has been opened up ready for use, as shown in Fig. 2, the adjustable bumper may be adjusted so as to bring the bumper element 98 against said wall.

The opposite end of the rod 12 preferably has a screw threaded cap 99 applied thereto.

I claim:

1. A folding bathtub for infants comprising a folding frame, a bathtub of flexible material supported thereby, two pairs of crossed supporting legs, the legs of each pair being pivoted together at the crossing point, means pivotally connecting the upper end of one leg of each pair to one end of the supporting frame, means pivotally connecting the upper end of the other leg of each pair to the other end of said frame, a separate foot secured directly to the lower end of each leg on the outside thereof and adapted to rest on the top edge of a standard bathtub, each foot having a downwardly directed clamping portion adapted to engage the inside of the standard bathtub, a connecting member provided with an open slot secured to the lower end of each of two corresponding legs of the two pairs of legs on the inside thereof, an extensible member extending between the connecting members carried by each of the two corresponding legs and removably mounted in the open ended slots thereof, and means to extend said extensible member thereby to clamp the legs to the standard tub.

2. A folding bathtub for infants comprising a folding frame, a bathtub of flexible material supported thereby, supporting means for said frame presenting four supporting legs, means pivotally connecting the upper ends of two of the legs to one end of said folding frame, means pivotally connecting the upper ends of the other two legs to the other end of said folding frame, a foot secured to the lower end of each leg on the outside thereof, each foot having a portion to rest on the top edge of a standard bathtub and a vertical clamping portion to engage the side wall thereof, a connecting member having an open slot secured to the inside of two corresponding legs at the lower ends thereof, an extensible clamping member extending between said connecting members and having its ends occupying said slots and also having collars engaging the connecting members, and means to extend said extensible member thereby to clamp the feet to the standard bathtub.

3. A folding bathtub for infants comprising a folding frame, a bathtub of flexible material supported thereby, two pairs of crossing supporting legs, the legs of each pair being pivoted together at the crossing point, means pivotally connecting the upper end of one leg of each pair of legs to one end of the folding frame, means pivotally connecting the upper end of the other leg of each pair of legs to the other end of said frame, a separate foot member pivotally secured to the lower end of each leg on the outside thereof, each foot member having a horizontal portion adapted to rest on the top edge of a standard bathtub and a vertical clamping portion directed downwardly from the horizontal portion and adapted to engage the inside face of the vertical wall of said standard bathtub, an extensible member located between and connecting the lower ends of two corresponding legs of the two pairs of legs, means to extend said extensible member thereby to force the lower ends of said two corresponding legs outwardly and thus to clamp the clamping portions of the corresponding feet against the inside of the standard bathtub, a toggle joint clamping member having two sections pivoted together, means pivotally connecting the end of one section to the lower end of one of the other two corresponding legs of the two pairs of legs, and means for detachably connecting the end of the other section of the toggle joint to the lower end of the other of said other two corresponding legs of the two pairs of legs.

4. A folding bathtub for infants comprising a folding frame, a bathtub of flexible material supported thereby, two pairs of crossing supporting legs, the legs of each pair being pivoted together at the crossing point, means pivotally connecting the upper end of one leg of each pair to one end of the folding frame, means pivotally connecting the upper end of the other leg of each pair to the other end of said folding frame, an arm pivotally mounted on the upper end of each of the two legs connected to one end of the folding frame, each arm extending beyond the leg to which it is pivoted, means for limiting the swinging movement of each arm, a dressing table and means providing a sliding pivotal connection between the dressing table and the projecting ends of said arms, whereby the dressing table may be supported in a vertical inoperative position at one end of the infants' bathtub or may be swung into an operative horizontal position resting on top of said infants' bathtub.

References Cited in the file of this patent

UNITED STATES PATENTS

| | | |
|---|---|---|
| 477,443 | O'Brien | June 21, 1892 |
| 1,427,598 | Jackson | Aug. 29, 1922 |
| 1,750,698 | Abbott | Mar. 18, 1930 |
| 1,756,716 | Whitney | Apr. 29, 1930 |
| 1,766,085 | Rumer | June 24, 1930 |
| 1,812,971 | McCandless | July 7, 1931 |
| 2,177,998 | Schuette | Oct. 31, 1939 |
| 2,237,177 | Fischer | Apr. 1, 1941 |
| 2,495,965 | Gustaveson | Jan. 31, 1950 |